United States Patent
Satapathy et al.

(10) Patent No.: US 7,089,280 B1
(45) Date of Patent: Aug. 8, 2006

(54) AUTONOMOUS ECLONE

(75) Inventors: Durga Prasad Satapathy, Olathe, KS (US); Tracy Nelson, Overland Park, KS (US); Peter H. Distler, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 813 days.

(21) Appl. No.: 10/005,493

(22) Filed: Nov. 2, 2001

(51) Int. Cl.
*G06F 15/16* (2006.01)

(52) U.S. Cl. .................. 709/203; 709/223; 709/204; 704/270.1

(58) Field of Classification Search ............... 709/203, 709/246, 229, 204–206, 223–225, 232, 245; 704/235, 260, 270.1, 275
See application file for complete search history.

(56) References Cited

U.S. PATENT DOCUMENTS

| | | | |
|---|---|---|---|
| 5,793,861 A * | 8/1998 | Haigh .................. 379/265.09 |
| 5,884,029 A | 3/1999 | Brush, II et al. |
| 5,982,390 A | 11/1999 | Stoneking et al. |
| 6,106,395 A | 8/2000 | Begis |
| 6,119,147 A | 9/2000 | Toomey et al. |
| 6,223,165 B1 | 4/2001 | Lauffer |
| 6,259,449 B1 * | 7/2001 | Saxena et al. ............... 715/853 |
| 6,263,066 B1 * | 7/2001 | Shtivelman et al. ... 379/266.06 |
| 6,359,892 B1 * | 3/2002 | Szlam ........................ 370/401 |
| 6,404,859 B1 * | 6/2002 | Hasan ........................ 704/270 |
| 6,411,696 B1 * | 6/2002 | Iverson et al. ......... 379/201.06 |
| 6,507,817 B1 * | 1/2003 | Wolfe et al. ................. 704/260 |
| 6,658,389 B1 * | 12/2003 | Alpdemir .................... 704/275 |
| 6,675,194 B1 * | 1/2004 | Pinard et al. ............... 709/202 |
| 6,684,238 B1 * | 1/2004 | Dutta ......................... 709/206 |
| 6,704,409 B1 * | 3/2004 | Dilip et al. ............ 379/265.02 |
| 6,820,055 B1 * | 11/2004 | Saindon et al. ............. 704/235 |
| 6,839,411 B1 * | 1/2005 | Saltanov et al. ......... 379/88.13 |
| 6,895,558 B1 * | 5/2005 | Loveland .................... 709/204 |
| 2001/0049603 A1 * | 12/2001 | Sravanapudi et al. .... 704/270.1 |
| 2002/0069048 A1 * | 6/2002 | Sadhwani et al. ............. 704/3 |
| 2002/0071539 A1 * | 6/2002 | Diament et al. ............ 709/206 |
| 2002/0123899 A1 * | 9/2002 | Hall et al. .................... 705/1 |
| 2002/0124100 A1 * | 9/2002 | Adams ....................... 709/232 |
| 2002/0160757 A1 * | 10/2002 | Shavit et al. ............... 455/414 |
| 2003/0069997 A1 * | 4/2003 | Bravin et al. ............... 709/250 |
| 2004/0015605 A1 * | 1/2004 | Demetriades et al. ....... 709/238 |
| 2004/0249650 A1 * | 12/2004 | Freedman et al. ............. 705/1 |

* cited by examiner

*Primary Examiner*—Philip B. Tran

(57) ABSTRACT

An autonomous eclone (10) comprises a plurality of interface agents (15,20,25,30) operable to interact with a person; an expert system (35) operable to process a command originated by any of the agents (15,20,25,30); and a database (40) accessible by the expert system (35) and operable to store all available information associated with a user. The eclone (10) also comprises an input authenticator and classifier (45) operable to authenticate and classify the person; a command creator (50) operable to create the command based upon a request; an output action generator (55) operable to execute the command and relay a result to any of the agents (15,20,25,30); and an activity logger (60) operable to log the request and the result. The expert system (35) is essentially a collection of rules that define how the eclone (10) reacts to each request.

8 Claims, 9 Drawing Sheets

AUTONOMOUS ECLONE

BACKGROUND OF THE INVENTION

1. Field of the Invention

The present invention relates to eclones. More particularly, the present invention relates to an autonomous eclone that can represent a user and respond to a message when the user is unavailable.

2. Description of Prior Art

Relatively new forms of communication and expanding marketplaces have placed many demands on business professionals. Professionals normally have a multitude of tasks that must be accomplished including, responding to email, answering telephone calls, participating in teleconferences, and participating in video-conferences. Additionally, professionals are often relied upon as resources by other employees and customers but are often unavailable because of the above described tasks.

As a consequence, other people wishing to reach professionals are often forced to leave voice-mail messages or send email messages. Unfortunately, voice-mail and email messages might not be attended to for a long time even if they are urgent and require immediate attention. Often such messages are routine and can be easily answered.

It is also common that two or more tasks need to be simultaneously accomplished. For example, business professionals frequently receive email messages while they are on the phone or voice-mail messages while they are participating in teleconferences. Currently, there is no way for a person to be able to simultaneously accomplish two or more of the tasks listed above.

There are services available that attempt to improve upon traditional voice-mail systems. These services attempt to automate voice-mail systems by including an electronic entity, or eclone, that decides where to forward a telephone call. Such attempts at creating an effective eclone are limited in that they cannot respond to a message autonomously.

Accordingly, there is a need for an improved autonomous eclone that can respond to a message when the user is unavailable and overcomes the other limitations of the prior art described above.

SUMMARY OF THE INVENTION

The autonomous eclone of the present invention overcomes the above-identified problems and provides a distinct advance in the art of eclones. More particularly the present invention provides an autonomous eclone that can represent a user and respond to a message when the user is unavailable.

The preferred autonomous eclone comprises a plurality of interface agents operable to interact with a customer or other person wishing to reach the user and create a request; an expert system operable to process a command originated by any of the agents; and a database operable to store all available information associated with the user. The autonomous eclone also comprises an input authenticator and classifier operable to authenticate and classify the person; a command creator operable to structure the command based upon the request; an output action generator operable to execute the command and relay a result to any of the agents; and an activity logger operable to log the request and the result.

The plurality of interface agents includes an agent for each method of modern communication, such as, an email agent, a telephone agent, a voice-mail agent, and a video-conference agent. The email agent monitors an email program. After a user-specified time-delay has elapsed without the user having read an incoming email from a person, the email agent appends the incoming email with an identifier forming a request. The request is relayed to the input authenticator and classifier.

The email agent receives a result from the output action generator and creates a reply email containing the result. The reply email is addressed and sent to an email address associated with the person.

The telephone agent monitors a traditional telephone line. After a user-specified ring-delay the telephone agent picks-up the line and plays a pre-configured greeting. The telephone agent uses a voice recognition function to convert a spoken sentence received from a person into a written statement. The written statement is appended with an identifier forming a request. The request is relayed to the input authenticator and classifier.

The telephone agent receives a result from the output action generator and converts the result into a spoken response. The telephone agent plays the response and asks the person if the response is adequate. If the person indicates that the response is adequate, the telephone agent hangs-up the line. If the person indicates that the response is inadequate, the telephone agent creates another request, as described above.

The voice-mail agent monitors a traditional voice-mail system. After a user-specified time-delay has elapsed without the user having listened to a voice-mail message from a person, a voice-mail agent retrieves the message. Using the voice recognition function, the voice-mail agent converts the message into a written statement. The written statement is appended with an identifier forming a request. The request is relayed to the input authenticator and classifier.

The telephone agent receives a result from the output action generator originating from the voice-mail agent. The telephone agent converts the result into a spoken response. Using a modem, the telephone agent picks-up a line and dials a phone number associated with the person. The telephone agent then determines whether its has reached another eclone, a traditional voice-mail system, or the person. If the telephone agent determines that it has been directed to another eclone, it requests to be forwarded to the voice-mail system. If the telephone agent determines that it has been directed to the voice-mail system, the telephone agent plays a pre-configured salutation and the response then hangs-up the line.

If the telephone agent determines that is has reached the person, the telephone agent plays the salutation and the response then asks if the response is adequate. If the person indicates that the response is adequate, the telephone agent hangs-up the line. If the person indicates that the response is inadequate, the telephone agent creates another request, as described above.

The video-conference agent operates substantially similar to the to telephone agent but includes a holographic image of the user. The video-conference agent represents the user on a video-conference in the same manner that the telephone agent represents the user on a telephone call.

The input authenticator and classifier receives a request including an identifier from any of the agents. The input authenticator and classifier compares the identifier with a list of known records and retrieves a classification associated with a matching record. The input authenticator and classifier modifies the request by replacing the identifier with the classification. The modified request is relayed to the command creator.

The command creator analyzes the written statement of the request using a set of grammar principles to create a command based upon the request. The command is created in the form of a database query requesting information. The command creator appends the command with the classification and relays it to the expert system.

The expert system is essentially a collection of rules that govern how a command is handled and limits what information is given to a person. The rules might include provisions such that a supervisor or family member is given any information in the database. The rules might only allow a colleague to be given business related information. The rules might also prevent an unknown person from receiving any information.

The expert system determines if the person is allowed to access the requested information by comparing the classification with the rules. If the command would query the database for information not allowed by the rules, the expert system modifies the command. The command is then relayed to the output action generator.

The output action generator executes the command by accessing the database, executing the query, and retrieving a result. The result is relayed to an appropriate agent, where it is relayed to the person.

The database stores all email sent or received by the user. The database also stores working files such as, word processing documents, spreadsheets, and presentations. Personal information such as, a home phone number, a birthday, a child's name, and an anniversary can also be stored in the database.

The activity log makes a note of each request and each result in the database so that the user can monitor and better configure the eclone.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
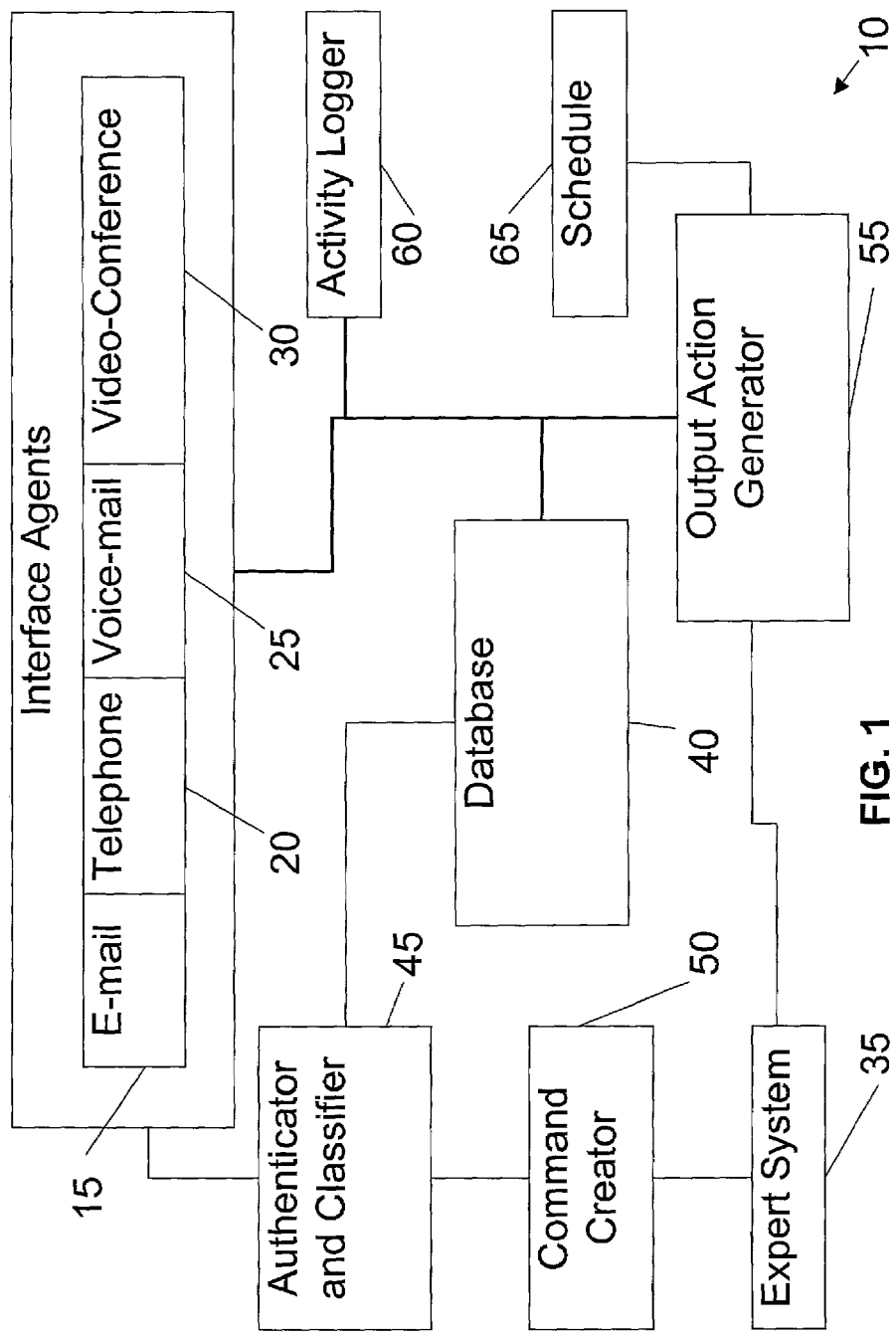
FIG. 1 is a block diagram of an autonomous eclone constructed in accordance with a preferred embodiment.

Referring to FIG. 1, an autonomous eclone 10 is shown constructed in accordance with a preferred embodiment of the present invention. The preferred autonomous eclone 10 represents a user such as a business professional and broadly comprises a plurality of interface agents 15,20,25,30 each operable to interact with a customer or other person wishing to reach the user and create a request; an expert system 35 operable to apply a collection of rules to a command originated by any of the agents 15,20,25,30; and a database 40 operable to store all available information associated with the user. The eclone 10 also comprises an input authenticator and classifier 45 operable to authenticate and classify the person; a command creator 50 operable to structure the command based upon the request received from any of the agents 15,20,25,30; an output action generator 55 operable to execute the command and relay a result to any of the agents 15,20,25,30; and an activity logger 60 operable to create a note containing the request and the result and store the note in the database 40.

The plurality of interface agents includes an agent for each method of modern communication, such as, an email agent 15, a telephone agent 20, a voice-mail agent 25, and a video-conference agent 30. The email agent 15 can be turned off or be configured to process an incoming email received from a person immediately. The email agent 15 can also be configured to operate on a user-specified time-delay basis. If the email agent 15 is turned off, the user can reply to the incoming email personally at their leisure. The time-delay basis allows the email agent 15 to process the incoming email after the user-specified time-delay has elapsed. For instance, if the user has not read or replied to the incoming email within an hour of its arrival, the email agent 15 would then process the incoming email.

The time-delay is specified by the user according to their desires. For example, if the user wanted to insure a prompt response, the user might specify a thirty second time-delay. Alternatively, if the user planned to be in their office and preferred to personally respond, the user might specify a three hour time-delay. The three hour time-delay would give the user up to three hours to personally respond and still ensure a response in the event the user was called away from their office.

The email agent 15 monitors an email program, such as, for example, Microsoft Outlook™ and processes the incoming email by appending it with an identifier which can include a name and an email address. The identifier is used by the input authenticator and classifier 45 to authenticate and classify the person. The email agent 15 also appends the incoming email with a routing word. The routing word is used by the output action generator 55 to determine where to relay a result. In this case, the routing word directs the output action generator 55 to relay the result to the email agent 15. The incoming email so appended forms a request which is relayed to the input authenticator and classifier 45.

When the email agent 15 receives the result from the output action generator 55, the email agent 15 composes a reply email containing the result. The reply email is addressed and sent to an email address associated with the person. In this manner, the eclone 10 responds to the person through the email agent 15 on behalf of the user.

The telephone agent 20 incorporates a modem in order to monitor, pick-up, and dial a traditional telephone line. The telephone agent 20 can also be configured to operate on a Private Branch Exchange (PBX). The telephone agent 20 can be configured to operate on a user-specified ring-delay basis. The ring-delay basis allows the telephone agent 20 to let the line ring any number of times before picking it up. For instance, if the telephone agent 20 was configured to operate on a five ring-delay basis, it would pick-up the line after the fifth ring. This allows the user to pick-up the line before the telephone agent 20, if the user is available.

The ring-delay is specified by the user according to their desires. It can be between zero rings, whereby the telephone agent 20 will attempt to pick-up the line before it even rings, and ten rings, allowing the user more than ample time to pick-up the line before the telephone agent 20.

The telephone agent 20 includes a voice recognition function and a speech synthesis function. The voice recognition function converts a plurality of spoken sentences received from a person into a written statement. The voice recognition function also creates a voice signature of the person, by noting a plurality of vocal characteristics. The plurality of vocal characteristics can include characteristics, such as, a pitch characteristic.

After the user-specified ring-delay, the telephone agent 20 picks-up the line and plays a pre-configured greeting. The greeting asks if a person would like to be forwarded to a traditional voice-mail system. Using the voice recognition function, the telephone agent 20 briefly listens to the line for an affirmative response. If the telephone agent 20 receives the affirmative response, the line is forwarded to the voice-mail system allowing the person to leave a message. Otherwise, the telephone agent 20 uses the voice recognition function to convert the plurality of spoken sentences into a written statement. The written statement is appended with an identifier which can include a voice signature and a phone number acquired through a traditional Caller ID system. The telephone agent 20 also appends the written statement with a routing word directing the output action generator 55 to relay a result to the telephone agent 20. The written sentence so appended forms a request which is relayed to the input authenticator and classifier 45.

When the result is received from the output action generator 55, the telephone agent 20 converts the result into a spoken response using the speech synthesis function. The telephone agent 20 plays the response and a pre-configured inquiry. The inquiry asks the person if the response is adequate. If the person indicates that the response is adequate, the telephone agent hangs-up the line. If the person indicates that the response is inadequate, the telephone agent 20 creates another request following the procedure described above.

The telephone agent 20 can also be used to represent the user on a teleconference call by participating on behalf of the user. The telephone agent 20 creates a request and plays a result as described above. The telephone agent 20 can be configured to receive or initiate the teleconference call.

The voice-mail agent 25 is similar to the email agent 15 but operates in conjunction with the telephone agent 20. The voice-mail agent 25 also includes a voice recognition function similar to the voice recognition function of the telephone agent 20. The voice-mail agent 25 can be turned off or configured to operate on a user-specified time-delay basis. The time-delay basis allows the voice-mail agent 25 to process a voice-mail message after the time-delay has elapsed. For instance, if the user has not listened to the message within an hour, the voice-mail agent 25 would then process the message, on behalf of the user.

The voice-mail agent 25 monitors a traditional voice-mail system and processes the message by first retrieving the message left by a person. Using the voice recognition function, the voice-mail agent 25 converts the message into a written statement. The voice recognition function can also create a voice signature of the person. The written statement is appended with an identifier as described above. The voice-mail agent 25 also appends the written statement with a routing word directing the output action generator 55 to relay a result to the telephone agent 20. The written statement so appended forms a request which is relayed to the input authenticator and classifier 45.

Any result associated with the request from the voice-mail agent 25 is relayed to the telephone agent 20. When the telephone agent 20 receives a result from the output action generator 55 originating from the voice-mail agent 25, the telephone agent 20 converts the result into a spoken response as described above. Using the modem, the telephone agent 20 picks-up a line and dials a telephone number associated with the person. The telephone number may be acquired through a traditional Caller ID system, ascertained from the message, or retrieved from the database. The telephone agent 20 determines whether its has reached another eclone, a traditional voice-mail system, or the person. If the telephone agent 20 determines that it has been directed to another eclone, it requests to be forwarded to the voice-mail system. If the telephone agent 20 determines that it has been directed to the voice-mail system, it plays a pre-configured salutation and the response then hangs-up the line.

If the telephone agent 20 determines that it has reached the person, it plays the salutation, the response, and the inquiry asking the person if the response is adequate. If the person indicates that the response is adequate, the telephone agent 20 hangs-up the line. If the person indicates that the response is inadequate, the telephone agent 20 creates another request following the procedure described above.

The video-conference agent 30 is similar to the telephone agent 20 except that the video-conference agent 30 includes a holographic image of the user. The image is created using a commonly available digital camera and is stored in the database 40. The user can configure the video-conference agent 30 to host a video-conference connection or initiate the connection. When configured to host the connection, the video-conference agent 30 waits until a person initiates the connection. When configured to initiate the connection, the video-conference agent 30 connects to a video-conference server.

The video-conference agent 30 also includes a voice recognition function and a speech synthesis function similar to the telephone agent 20. The voice recognition function converts a plurality of spoken sentences received from a person into a written statement. The voice recognition function also creates a voice signature of the person as described above. The written statement is appended with an identifier and a routing word directing the output action generator 55 to relay a result to the video-conference agent 30. The written statement so appended forms a request which is relayed to the input authenticator and classifier 45.

When a result is received from the output action generator 55, the video-conference agent 30 converts the result into a spoken response using the speech synthesis function. The video-conference agent 30 plays the response over the connection. In this manner, the video-conference agent 30 interacts with the person on behalf of the user.

It is within the scope of the present invention to include other interface agents, such as, a wireless messaging device agent. It is also within the scope of the present invention to make modifications to the above agents, such as, for example, modifying the telephone agent 20 so that it can be configured to operate with a cellular phone. Further, it is within the scope of the present invention for there to be a plurality of telephone agents 20, each operating on one of a plurality of telephone lines.

As described above, each interface agent represents the user on one of a plurality of communications medium. Each agent converts a person's statement into a written statement.

Each agent then appends the written statement with an identifier and a routing word forming a request. The request is then relayed to the input authenticator and classifier 45.

The input authenticator and classifier 45 authenticates and classifies each person. Each request is in the form of a written statement appended with an identifier and a routing word. The identifier can include a plurality of identifying data, such as, an email address, a name, a phone number, and a voice signature. The input authenticator and classifier 45 compares the identifier with a list of known records. If the identifier is not found in any of the records, the input authenticator and classifier 45 creates a new record with a default classification and adds the new record to the list. If the identifier matches a known record, the input authenticator and classifier 45 retrieves a classification associated with the record. Each classification is fully configurable by the user.

The input authenticator and classifier 45 modifies the request by replacing the identifier with the classification. The modified request is relayed to the command creator 50.

The command creator 50 analyzes the written statement of the request using a set of grammar principles to create a command based upon the request. The command is created in the form of a database query requesting information from the database. This technique is commonly used in search engines, such as, for example, Ask Jeeves™.

It is anticipated that many requests will simply ask for a piece of information stored in the database, such as, a request for information contained in a presentation created by the user. The command enables the output action generator 55 to retrieve the information in the form of a result.

It is also anticipated that a request might supply a piece of information and not actually ask for information, such as, a person calling to give the user a phone number where they can be reached. Alternatively, a request might simply be a response from an eclone 10 of another user. In either case, the command creator 50 would create a command that enters, rather than retrieves, information in the database 40.

In either case, the command creator 50 appends the command with the classification and the routing word. The command creator 50 then relays the command to the expert system 35.

The expert system 35 is essentially the collection of rules that govern how a command is handled and limits what information is given to a person. The rules might include provisions such that a supervisor or a family member is given any information in the database. The rules might only allow a colleague to be given business related information. The rules might also prevent an unknown person from receiving any information. As will be discussed further, the database holds all available information about a user. Therefore, information such as, a home phone number, a child's name, and a birthday could be in the database, but unavailable to a telemarketer.

The expert system 35 modifies the command in accordance with the rules. For instance, if a command would give an unknown person the home phone number, the expert system 35 would replace the command with a rejection command. The rejection command would cause the output action generator 55 to retrieve a pre-configured rejection message instead of the home phone number.

As an example, a person calls and speaks to the telephone agent 20 asking for the user's cellular telephone number. The command creator 50 creates a query that would search the database 40 for a cellular phone number associated with the user. The expert system 35 might include a provision to limit distribution of the number to a supervisor. If the person is not authenticated as a supervisor, the expert system 35 would modify the query so that the output action generator 55 retrieved the rejection message. The rejection message would inform the person that they are not authorized to receive the requested information.

The rules can be in a standard conditional format, such as, "if the classification corresponds to a supervisor, then relay the command without modification". Alternatively, one of the rules might be, "if the classification corresponds to an unknown person, then replace the command with the rejection command". The rules are configurable by the user, thus enabling the user to modify how the eclone 10 reacts to each request.

The expert system 35 can also modify the routing word. For instance, if the eclone 10 receives an urgent email from a family member asking the user to call home, the expert system 35 would modify a routing word and a command resulting from the email. The routing word would be modified to direct the output action generator 55 to relay a result to the telephone agent 20. The command would be modified to cause the output action generator 55 to include either a portion of the email or a pre-configured alert in the result. The telephone agent 20 would then call a cellular phone associated with the user and ask the user to call home by playing a response containing the result. As described above, the result could include the portion of the email or the alert.

As an example, a person calls and speaks to the telephone agent 20 asking for all information relating to a specific vendor. The person asks that the information be sent to them via email. The command creator 50 creates a query that would cause the output action generator 55 to search the database 40 for everything related to the vendor. The expert system 35 would determine if the person is permitted to receive the information.

The rules might allow the person to access all information about the vendor except contract documents. The rules might further limit a result to one megabyte of data. The expert system 35 would modify the query such that it would search for the most recent one megabyte of information other than contract documents. The result would be sent to the person through the email agent 15 as described above.

The expert system 35 also maintains the database 40 by monitoring all email and documents received or generated by the user and storing them in the database 40 according to the rules.

The output action generator 55 executes the command received from the expert system 35. The output action generator 55 accesses the database and runs the query, retrieving a result. The output action generator 55 relays the result to an appropriate agent 15,20,25,30 according to the routing word.

The output action generator 55 can also access a schedule 65, such as, for example, Microsoft Outlook™. If the command asks for a meeting, the output generator 55 can access the schedule 65, find an open time slot, and create an appointment with the user. The schedule 65 can be separate from or included within the database 40.

The database 40 stores all email sent or received by the user. The database 40 also stores working files such as, word processing documents, spreadsheets, and presentations. Personal information such as, a home phone number, a birthday, a child's name, and an anniversary can also be stored in the database 40.

The activity logger 60 makes a note of each request and each result. The note is stored in the database 40 so that the user can monitor and better configure the eclone 10.

In use, a user configures the eclone 10 by inputting information. The user can choose any of the interface agents 15,20,25,30 for this purpose. The information includes the user's email account, the user's network ID, and any other information the user would like to add to the database 40. The information also includes the user-specified and pre-configured items described above. The information is relayed to the input authenticator and classifier 45. The input authenticator and classifier 45 builds a complete record of the user including a voice signature. The voice signature will allow the eclone 10 to authenticate the user, in future interactions. The information is also relayed to the command creator 50.

The command creator 50 creates a command in the form of database queries that enter the information into the database 40. The expert system 35 receives the command and is operable to automatically configure the agents 15,20, 25,30 according to the information. The expert system can modify the command in order to direct the information to a specific location, such as, for example, a plurality of configuration files that are stored in the database 40. The files can be used by the eclone 10 in executing its respective functions. The output action generator 55 executes the command, thereby configuring the eclone 10. Once the eclone 10 is configured, the user can attend to other business.

The flow charts of FIGS. 2–10 show the functionality and operation of a preferred implementation of the present invention in more detail. In this regard, some of the blocks of the flow charts may represent a module segment or portion of code of a computer program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

Figure 2:
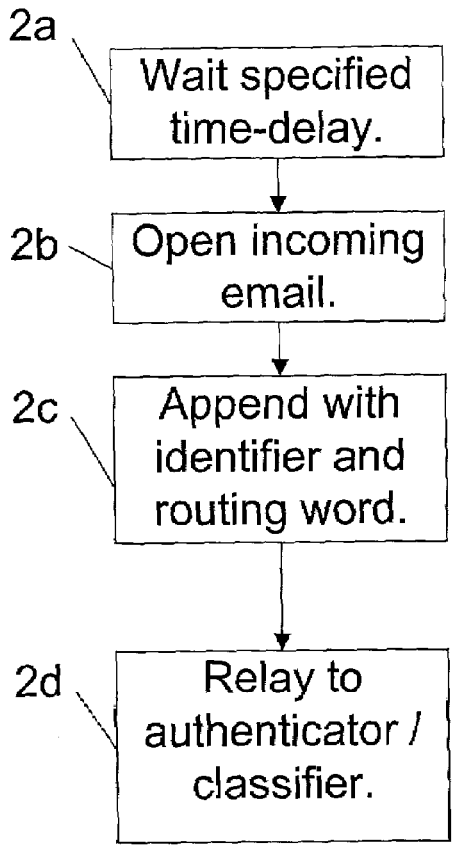
FIG. 2 is a flow chart showing an incoming email receiving procedure.

As shown in FIG. 2, the email agent monitors an email program for incoming email messages and waits a user-specified time-delay before processing an incoming email received from a person as depicted in step 2a. The email agent 15 then opens the incoming email as depicted in step 2b. The email agent 15 appends the incoming email with an identifier and a routing word forming a request as depicted in step 2c. The request is relayed to the input authenticator and classifier 45 as depicted in step 2d.

Figure 3:
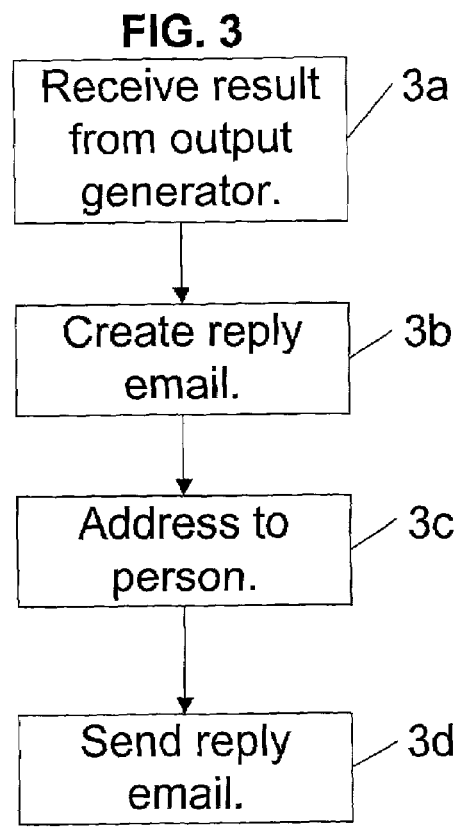
FIG. 3 is a flow chart showing a reply email procedure.

As shown in FIG. 3, the email agent 15 receives a result from the output action generator 55 as depicted in step 3a. The email agent 15 creates a reply email containing the result as depicted in step 3b. The reply email is addressed to an email address associated with the person as depicted in step 3c. The reply email is then sent to the person as depicted in step 3d.

As an example, the incoming email might request an update on a specific project. The input authenticator and classifier 45 would choose a classification according to the identifier. The command creator 50 would create a command that would query the database 40 for the latest information relating to the project. The information could include project schedules, contract documents, engineering drawings, and budgetary presentations. The expert system 35 would determine if the rules allow that type of information to be given to a person with the classification and modify the command accordingly. The output action generator 55 would execute the command, retrieve the most relevant information, and relay the result to the email agent 15. The email agent 15 would then create and send a reply email as described above.

Figure 4:
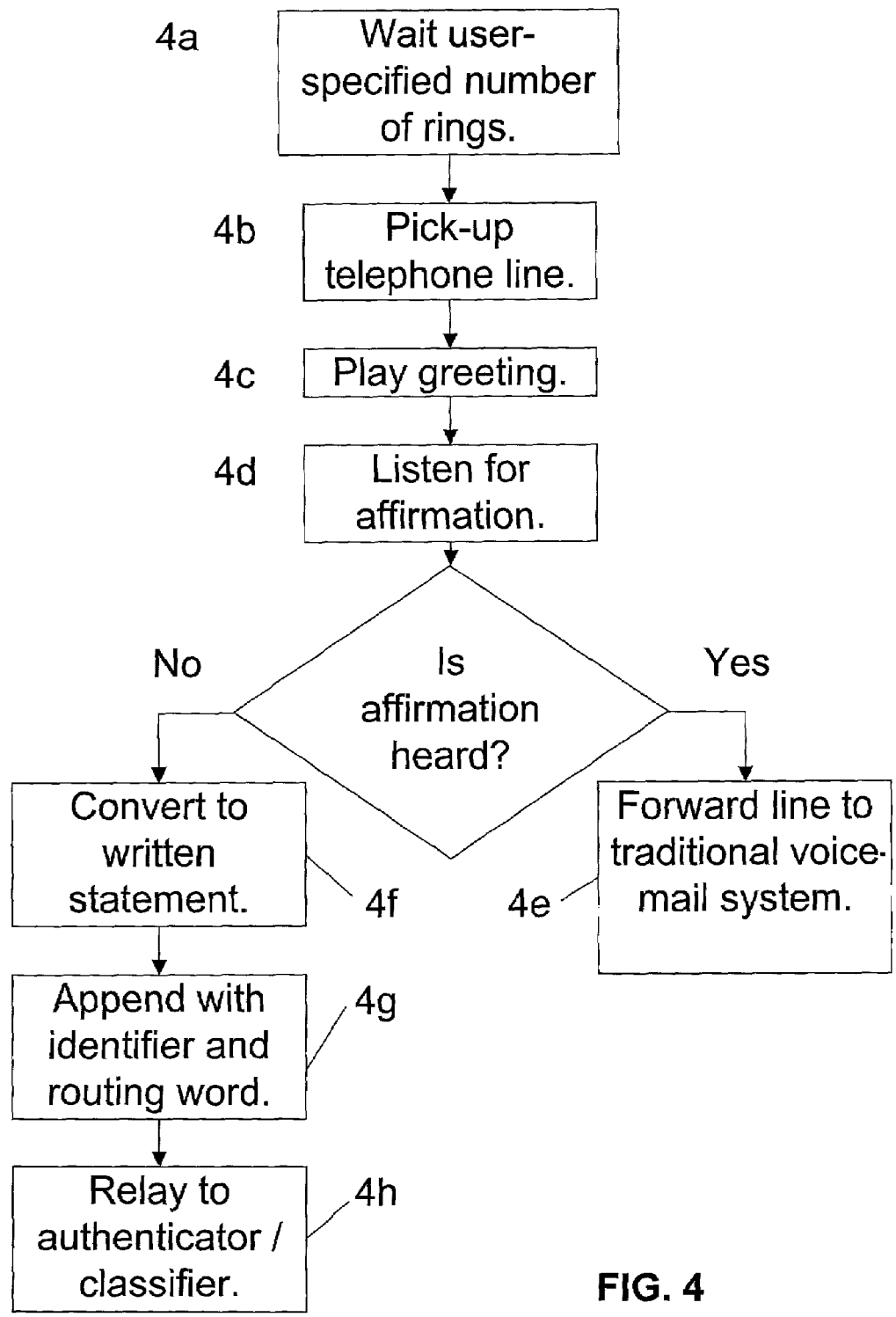
FIG. 4 is a flow chart showing a telephone answering procedure.

As shown in FIG. 4, the telephone agent 20 waits the user-specified number of rings as depicted in step 4a. The telephone agent 20 picks-up a line as depicted in step 4b. The telephone agent 20 plays a pre-configured greeting as depicted in step 4c. The greeting asks a person if they would like to be transferred to a traditional voice-mail system. Using the voice recognition function, the telephone agent 20 briefly listens to the line for an affirmative answer as depicted in step 4d. If the telephone agent 20 receives the affirmative answer, the line is forwarded to the voice-mail system as depicted in step 4e. Otherwise, the telephone agent 20 uses the voice recognition function to convert a spoken sentence received from the person into a written statement as depicted in step 4f. The written statement is appended with an identifier and a routing word as depicted in step 4g. The request is relayed to the input authenticator and classifier 45 as depicted in step 4h.

Figure 5:
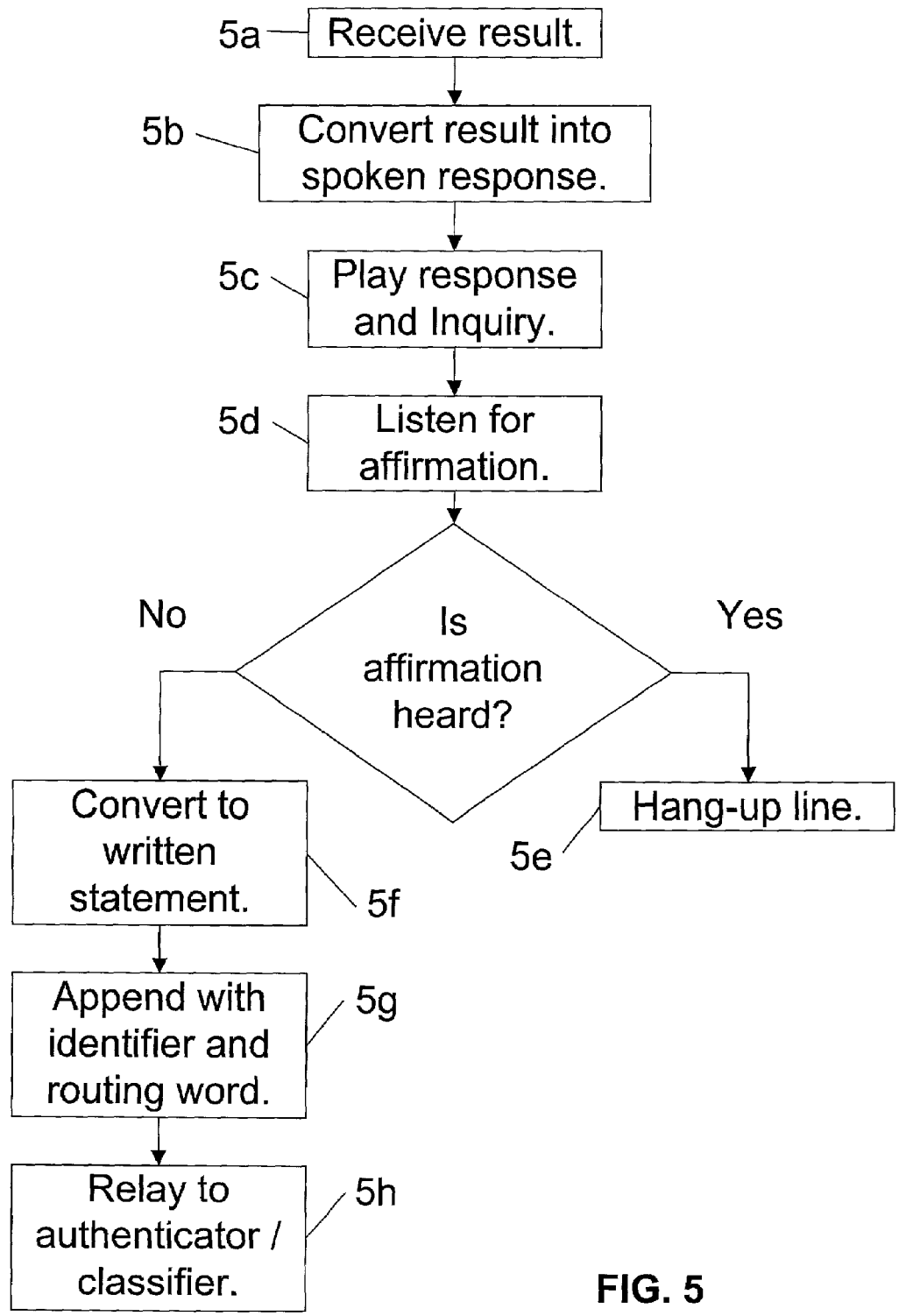
FIG. 5 is a flow chart showing a telephone response procedure.

As shown in FIG. 5, the telephone agent 20 receives a result from the output action generator 55 as depicted in step 5a. The telephone agent 20 converts the result into a spoken response as depicted in step 5b. The telephone agent 20 plays the response and a pre-configured inquiry asking the person if the response is adequate as depicted in step 5c. The telephone agent 20 briefly listens for an affirmative answer as depicted in step 5d. If the telephone agent 20 receives the affirmative answer, the telephone agent 20 hangs-up the line as depicted in step 5e. Otherwise, the telephone agent 20 creates another request as described above and depicted in steps 5f,5g,5h.

As an example, the person might request a budget figure. The input authenticator and classifier 45 would choose a classification according to the identifier. The command creator 50 would create a command that would query the database 40 for recent budget information, which could include approved, actual, and projected budget figures. The expert system 35 would determine if the rules allow that type of information to be given to a person with the classification and modify the command accordingly. The output action generator 55 would execute the command, retrieve the most relevant information, and relay the result to the telephone agent 20. The telephone agent 20 would then create and play a response as described above.

Figure 6:
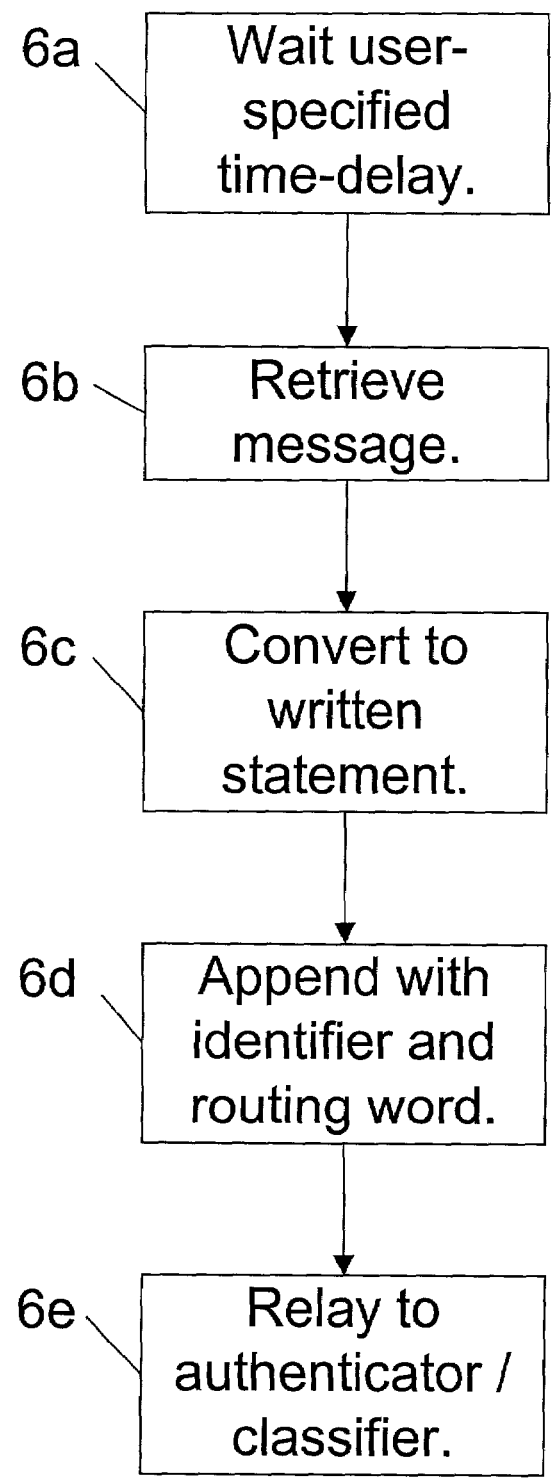
FIG. 6 is a flow chart showing a voice-mail receiving procedure.

As shown in FIG. 6, the voice-mail agent 25 monitors a traditional voice-mail system and waits a user-specified time-delay as depicted in step 6a. When a message meets the time-delay criteria, the voice-mail agent 25 retrieves the message as depicted in step 6b. Using the voice recognition function, the voice-mail agent 25 converts the message received from a person into a written statement as depicted in step 6c. The written statement is appended with an identifier and a routing word forming a request as depicted in step 6d. The request is relayed to the input authenticator and classifier 45 as depicted in step 6e.

Figure 7:
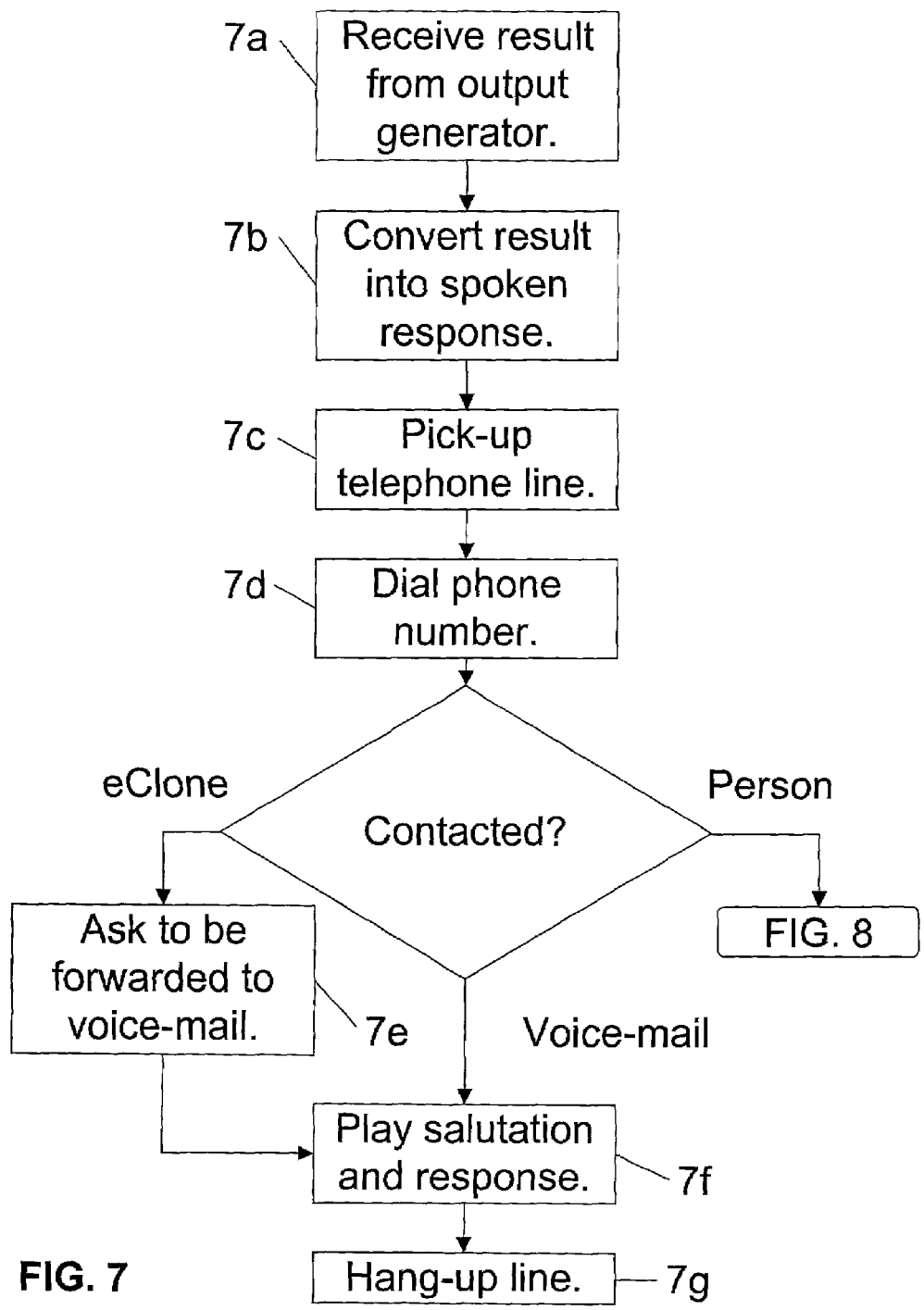
FIG. 7 is a flow chart showing a voice-mail response procedure.

As shown in FIG. 7, the telephone agent 20 receives a result from the output action generator 55 originating from the voice-mail agent 25 as depicted in step 7a. The telephone agent 20 converts the result into a spoken response as depicted in step 7b. The telephone agent 20 picks-up a line as depicted in step 7c. The telephone agent 20 dials a phone number associated with the person as depicted in step 7d. The telephone agent 20 then determines whether its has reached another eclone, a traditional voice-mail system, or the person. If the telephone agent 20 determines that it has reached another eclone, it requests to be forwarded to the voice-mail system as depicted in step 7e. If the telephone agent 20 determines that it has reached the voice-mail system, the telephone agent 20 plays a pre-configured salutation and the response as depicted in step 7f. The telephone agent 20 then hangs-up the line as depicted in step 7g. If the telephone agent determines that is has reached the person, the telephone agent follows a procedure of FIG. 8.

Figure 8:
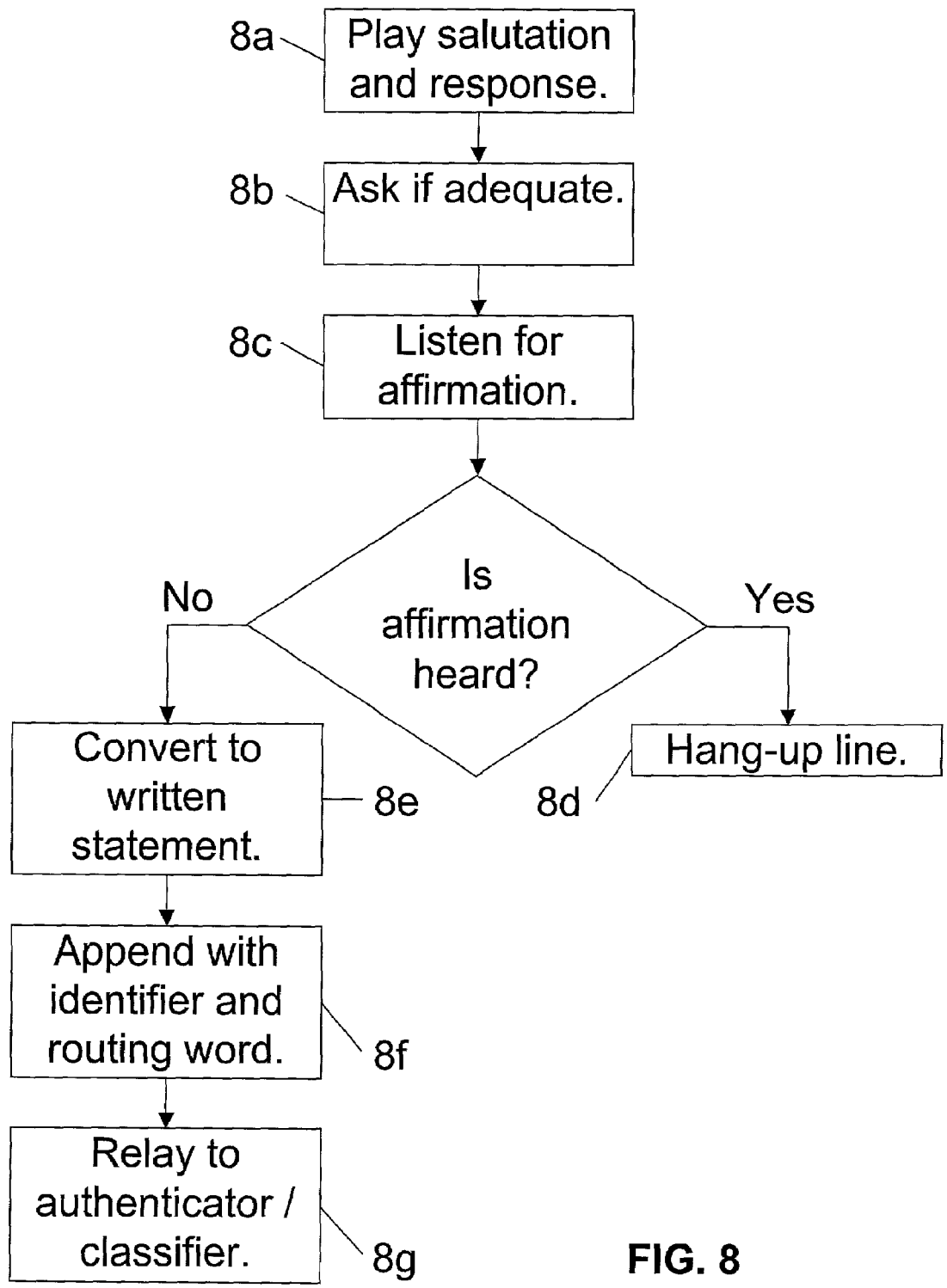
FIG. 8 is a flow chart showing a voice-mail response procedure where the eclone has reached a customer, in person.

As shown in FIG. 8, the telephone agent 20 plays the salutation and the response as depicted in step 8a. The telephone agent 20 then plays a pre-configured inquiry asking if the response is adequate as depicted in step 8b. The telephone agent 20 briefly listens for an affirmative answer as depicted in step 8c. If the telephone agent 20 receives the affirmative answer, the telephone agent 20 hangs-up the line as depicted in step 8d. Otherwise, the telephone agent 20 creates another request as described above and depicted in steps 8e,8f,8g.

As an example, the message might request a meeting with the user. The input authenticator and classifier 45 would choose a classification according to the identifier. The command creator 50 would create a command that would access the schedule 65 and search for an available appointment time. The expert system 35 would determine if the rules allow the eclone to make an appointment for a person with the classification and modify the command accordingly. The output action generator 55 would execute the command, create the appointment, and relay the result to the telephone agent 20. The telephone agent 20 would then create and play a response as described above.

The video-conference agent 30 operates substantially similar to the telephone agent 20. One significant difference is that the video conference agent 30 includes a holographic image of the user.

Figure 9:
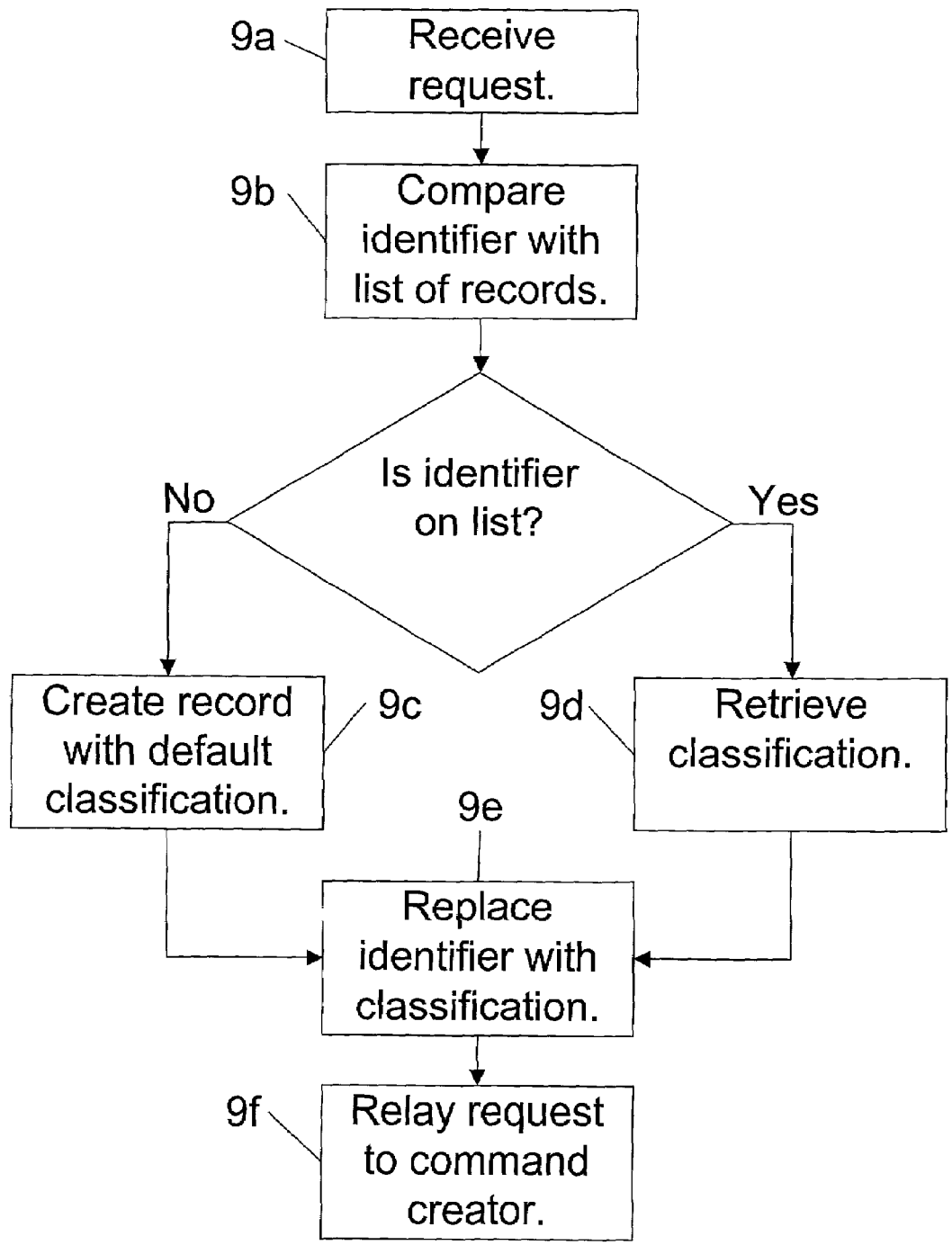
FIG. 9 is a flow chart showing an authentication and classification procedure.

As shown in FIG. 9, the input authenticator and classifier 45 receives a request including an identifier as depicted in step 9a. The input authenticator and classifier 45 compares the identifier with a list of known records as depicted in step 9b. If the identifier is not found in any of the records, the input authenticator and classifier 45 creates a new record with a default classification and adds the new record to the list as depicted in step 9c. If the identifier matches one of the known records, the input authenticator and classifier 45 retrieves a classification associated with the record as depicted in step 9d. The input authenticator and classifier 45 modifies the request by replacing the identifier with the classification as depicted in step 9e. The modified request is relayed to the command creator 50 as depicted in step 9f.

It is anticipated that, on occasion, a person who is known to the user will not be properly authenticated. This may occur for a variety of reasons, such as, for example, the person calls from an unknown phone number or calls on a poor quality line so that the person's voice signature is affected. Therefore, the input authenticator and classifier 45 also include a password in each record. If an identifier does not match a known record, but the person uses the password, the input authenticator and classifier 45 is still able to choose a correct classification.

Figure 10:
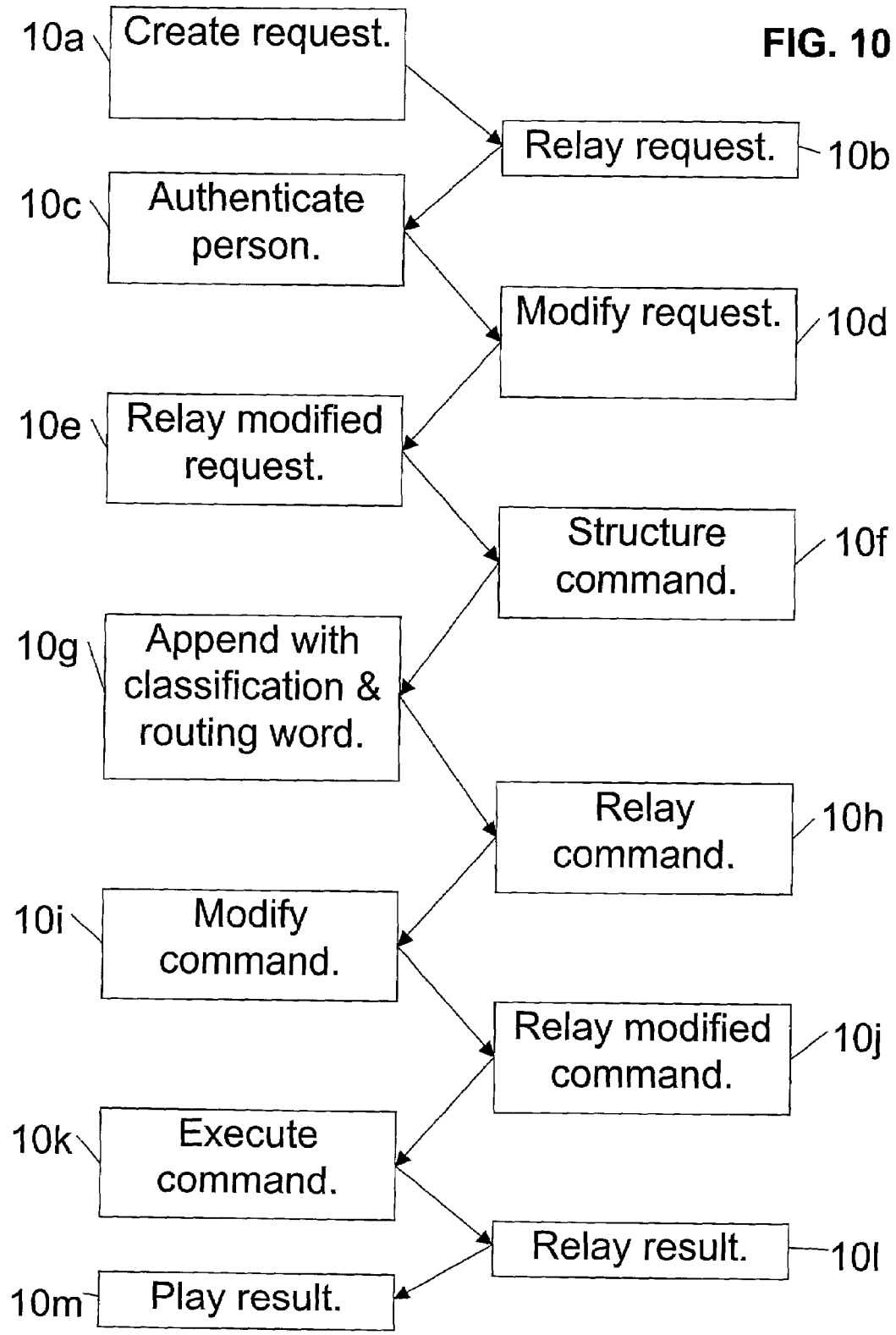
FIG. 10 is a flow chart showing an operational overview.

FIG. 10 shows the overall procedure. Any of the interface agents 15,20,25,30 interacts with a person and creates a request with an identifier and a routing word as described above and depicted in step 10a. The interface agent relays the request to the input authenticator and classifier 45 as depicted in step 10b. The input authenticator and classifier 45 authenticates the person by comparing the identifier with a list of known records as depicted in step 10c. The input authenticator and classifier 45 then modifies the request by replacing the identifier with a classification associated with a matching record as depicted in step 10d. The input authenticator and classifier 45 relays the modified request to the command creator 50 as depicted in step 10e. The command creator analyzes the request and structures a command as depicted in step 10f. The command creator 50 then appends the command with the classification and the routing word as depicted in step 10g. The command creator 50 relays the command to the expert system 35 as depicted in step 10h. The expert system 35 modifies the command by applying a collection of rules as depicted in step 10i. The expert system 35 then relays the modified command to the output action generator 55 as depicted in step 10j. The output action generator 55 executes the command which is in the form of a database query as depicted in step 10k. The output action generator 55 retrieves and relays a result to an appropriate interface agent 15,20,25,30 according to the routing word as depicted in step 10l. The appropriate interface agent 15,20,25,30 plays the result as depicted in step 10m.

It is anticipated that the person will require more information than is contained in one result. Therefore, the above procedure can be repeated as desired with the interface agent creating a new request and playing a new result each iteration.

As an example, a person might need an updated project schedule for a specific project with a specific name. The person would call and speak to the telephone agent 20 asking for the latest information concerning the project, thereby inadvertently not limiting a request to schedule information. The command creator 50 would create a database query for information containing a reference to the project with the most recent date. The query would search the database 40 using the name as a keyword. The output action generator 55 would execute the query and might return a budget analysis for the project that the user received by email ten minutes ago. The analysis would be included in a response to the person, through the telephone agent 20. The telephone agent 20 would also play the inquiry asking if the response was adequate.

The person, realizing that they did not receive the desired schedule information, would initiate another request by responding that the response was inadequate and asking for the latest schedule information. The command creator 50 would create another query, further limited to schedule information. The output action generator 55 would execute the query and might return a result including a project schedule presentation that the user created three hours ago, which would be included in a response to the person.

In the case of information in a format not suited to being relayed verbally, such as, drawings, figures, and images, the result could be a description of the information and an offer to email it to the person. While the ability to email a file is extremely advantageous in the case of such types of information, it is not limited to drawings and similar files. Any information that is in the database 40 can be sent via email to a person, upon request, provided the rules allow the person to receive such information.

If, in the example above, the person asked for the project schedule presentation to be sent to them, the telephone agent 20 would append the request with a routing word directing the output action generator 55 to relay the result to the email agent 15, who would create and send a reply email as described above. The reply email would include the project schedule presentation.

Alternatively, the information could be placed on a server accessible through an intranet or internet. The information could be kept secure through the use of a password, an encryption scheme, or any other security technique. In this case, the result could be a description of the information, a Uniform Resource Locator (URL) link to the information, and the password.

As another example, a person sends a first email to the user asking for a two hour appointment with the user on Monday morning. The command creator 50 creates a command that would cause the output action generator 55 to access the schedule 65 and determine if the user has a two hour opening on Monday morning.

A first result might show that the user is busy Monday morning. Alternatively, the user might modify the rules to prevent any appointments from being made on Monday mornings, whether or not there is available time. In either case, a first reply email would inform the person that the user is unavailable. The first reply email could also inform the person that the user is available on Monday afternoon and Thursday morning. The person could then send a second email asking for a two hour appointment either Monday afternoon or Thursday morning.

In is anticipated that the user might enter a half day appointment on Monday afternoon, after the first email and before the second email. In this case, the output action generator 55 will retrieve a second result corresponding to the second email. The second result would be a confirmation of a two hour appointment on Thursday morning, since Monday afternoon is no longer available. The person would be so informed in a second reply email.

Having thus described a preferred embodiment of the invention, what is claimed as new and desired to be protected by Letters Patent includes the following:

The invention claimed is:

1. A system operable to represent a user of a plurality of message mediums and to independently respond to a person wishing to communicate with the user via an unattended one of said message mediums, the system comprising:
   a plurality of interface agents each coupled to a respective message medium and each operable to detect an unattended message received from the person, convert the unattended message into a written request, append the request with an identifier for identifying the person wishing to communicate with the user, and relay a result to the person;
   an authenticator operable to match the identifier with one of a plurality of known records, thereby authenticating the person;
   a classifier operable to create, store, and retrieve a classification associated with each record;
   a command creator operable to convert the request into a database query;
   an expert system operable to modify the query by applying a collection of rules;
   a database operable to store information relating to the user; and
   an output action generator operable to access the database, execute the query thereby generating the result based on the information in the database, and relay the result to the interface agents.

2. The system as set forth in claim 1, at least one of the interface agents being further operable to convert the result into a synthesized speech response.

3. The system as set forth in claim 1, at least one of the interface agents being further operable to convert a spoken message into the written request.

4. The system as set forth in claim 3, at least one of the interface agents being further operable to generate a voice signature based upon the spoken message.

5. The system as set forth in claim 1, the interface agents being selected from the group consisting of an email agent, a telephone agent, a voice-mail agent, and a video-conference agent.

6. The system as set forth in claim 1, the information stored in the database being selected from the group consisting of email, word processing documents, spreadsheets, presentations, schedules, contracts, drawings, figures, telephone numbers, dates, names, records, notes, files, images, addresses, and personal data about the user.

7. A system operable to represent a user of a message medium and to independently respond to a message received from a person wishing to communicate with the user when the message medium is unattended by the user, the system comprising:
   an interface agent operable to detect an unattended spoken message received from the person, convert the spoken message into a written request, generate a voice signature based upon the spoken message, append the request with an identifier for identifying the person wishing to communicate with the user, and convert a result into a verbal response;
   an authenticator operable to match the identifier with one of a plurality of known records, thereby authenticating the person;
   a classifier operable to create, store, and retrieve a classification associated with each record;
   a command creator operable to convert the request into a database query;
   an expert system operable to modify the query by applying a collection of rules;
   an output action generator operable to execute the query generating and relaying the result to the interface agent; and
   a database operable to store information which is accessed by the output action generator through executing the query.

8. The system as set forth in claim 7, the information stored in the database being selected from the group consisting of email, word processing documents, spreadsheets, presentations, schedules, contracts, drawings, figures, telephone numbers, dates, names, records, notes, files, images, addresses, and personal data about the user.

* * * * *